Dec. 11, 1928.

H. G. DONALD 1,694,936

LIQUID VAPORIZER

Filed Aug. 19, 1925

H. G. DONALD 1,694,936

LIQUID VAPORIZER

Filed Aug. 19, 1925

Harry G. Donald
Inventor

By Robert A. Lavender
Attorney

Dec. 11, 1928.

H. G. DONALD 1,694,936

LIQUID VAPORIZER

Filed Aug. 19, 1925

Patented Dec. 11, 1928.

1,694,936

UNITED STATES PATENT OFFICE.

HARRY G. DONALD, OF PHILADELPHIA, PENNSYLVANIA.

LIQUID VAPORIZER.

Application filed August 19, 1925. Serial No. 51,122.

My invention relates broadly to liquid vaporizers and more particularly to boilers of the water tube type.

I have found by experiment that those tubes in water tube boilers that are directly exposed to the radiant heat of the flames and the furnace surfaces as well as to heat conducted by the gases of combustion absorb a large portion of the heat absorbed by the so-called water heating surfaces. Heat transmitted by radiation is absorbed at a rate that varies in quantity as the fourth power of the absolute temperature of the radiating surface, while heat transmitted by convection, only, varies approximately as the mean temperature difference between the tubes and the combustion gases in contact with them. In the case of absorption of radiant heat the temperature of the resulting steam, or the proportion of steam to water, decreases as the rate of combustion increases or as the percent of carbon dioxide in the flue gases decreases, the rate of firing remaining constant. To the contrary, however, there is an increase of heat transfer by convection with an increase in the rate of combustion or a decrease in the carbon dioxide present in the flue gases, the rate of firing remaining constant. The net result of the heating effect by both radiation and convection is found to be maintained nearly constant if the rate of firing remains constant.

The object of my invention is to increase the efficiency of a boiler by the production of dry or superheated steam without materially changing the structure of the boiler and without employing a superheater.

Another object of my invention is to utilize the greater heat absorption of those tubes exposed to both radiant and convection heat for increased boiler efficiency.

Another object of my invention is to decrease the turbulence at the steam liberation surface.

A still further object of my invention is the production of steam of high quality from relatively poor feed water.

These and other objects are secured by connecting those tubes of a boiler, of usual and accepted construction, that are exposed to both radiant heat and heat by convection, to a steam drum separate from a drum or drums to which the remaining tubes are connected. By so connecting these tubes, the steam generated does not have to pass thru the large body of water circulating in the remaining tubes and the liberation of steam is greatly facilitated. A high velocity flow then obtains in the first mentioned tubes that greatly increases the effective transfer of heat. The use of a separate drum also overcomes the difficulties of turbulence and priming attendant upon the use of drums into which other tubes as well as those exposed to radiant heat feed a mixture of heated liquid and vapor.

A comparatively quiet steam liberation resulting from separate drums permits a higher water level to be carried thus giving an increased liberating surface and lessening the care and attention required. The relative freedom from priming also gives a more efficient operation of a superheater should one be attached. It also promotes the flow thru the tubes and thereby materially lessens the dangers of tube distortion. A steam of high quality can thus be obtained even though the concentration of solids is greater than normal.

The drum is preferably though not necessarily located above the usual drums and the normal water level maintained in the boiler in order that longer tubes may be used and a greater surface area exposed to the heating action by radiant heat. Such a location also gives a free steam space into which only dry saturated or superheated steam is delivered and the boiler may be so operated as to obviate the need of a separate superheater.

Reference is to be had to the accompanying drawing forming part of the specification in which like reference characters indicate corresponding parts throughout the several views and in which Figure 1 is a section of an express or "A" type of boiler showing an application of my invention.

Figure 1:
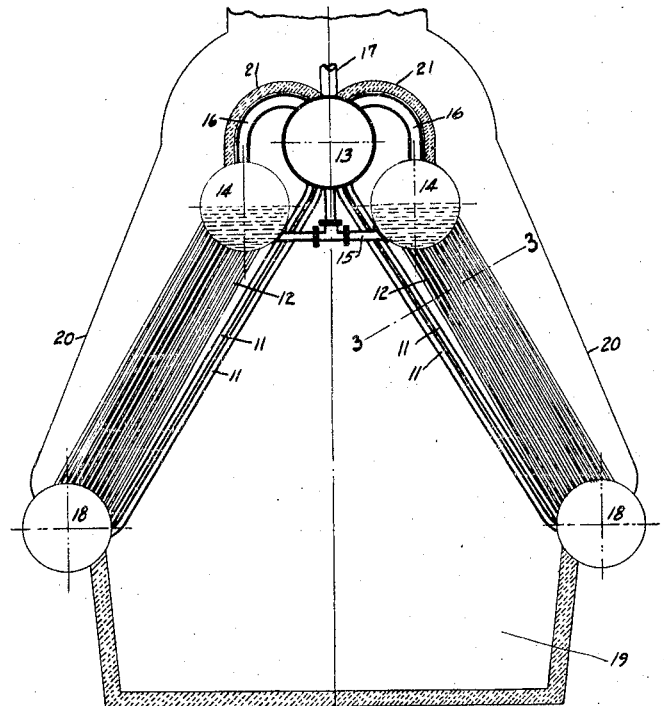
Figure 2:
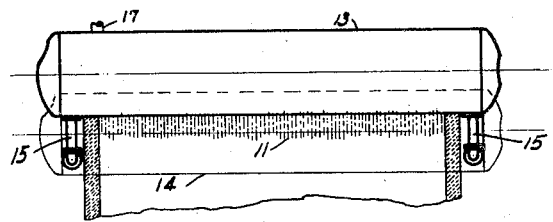
Figure 2 is a partial vertical longitudinal section of the boiler.
Figure 3:
Fig. 3 is a section on the line 3—3 of section 1.

In the embodiment of my invention as illustrated tubes 11 receive the heat by radiation from the flame and furnace 19. These tubes are staggered in alternate rows, as shown in Figure 3, forming a shield against heat by radiation for the remaining tubes 12 that receive heat by contact with the gases of combustion only. The tubes 11 and 12 are connected to the mud or water drums 18. The upper ends of the tubes 12 open into steam liberating drums 14 but a separate steam drum 13 is provided for tubes 11. The drum 13 is preferably placed above the drums 14 and above the normal water level therein, to give a free steam space and also to permit the use of longer tubes 11, thereby increasing the effective heating area of these tubes. A drain 15 connects the drum 13 with the drums 14. The steam spaces may be connected by the pipes 16. The main steam line 17 is shown as leading from the drum 13. Baffles 21 prevent escape of gases between the drums. The whole structure is enclosed by the usual boiler casing 20.

This construction is readily adaptable to boilers of standard design as it merely requires the tubes exposed to radiant heat to be connected to a separate drum and the usual drums properly connected in the steam system. The separate drum may be located below the usual steam separating drums or within the furnace chamber when the boiler construction makes it necessary or desirable.

Figure 4:
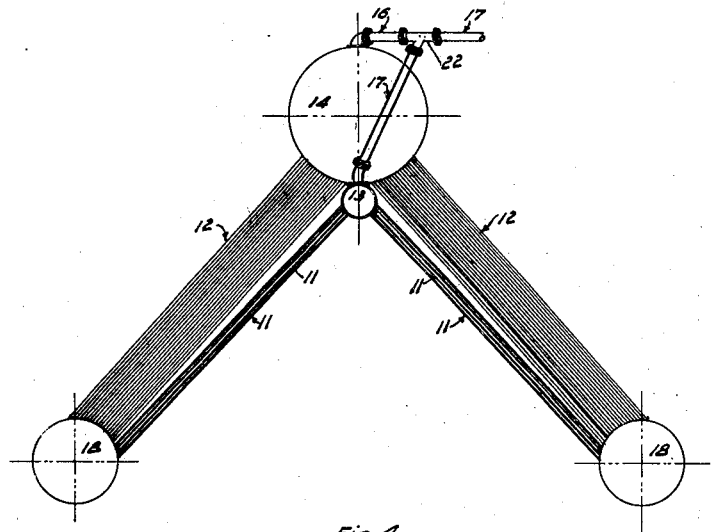
Figure 4 is a section of an express or "A" type of boiler showing an application of my invention with the separate steam drum below the normal working water level of the main steam drum.

Figure 4 shows an embodiment of my invention with the separate steam drum 13 located below the steam drum 14. The main steam line 17 is connected directly to drums 13 and 14 by the Y connection 22.

Figure 5:
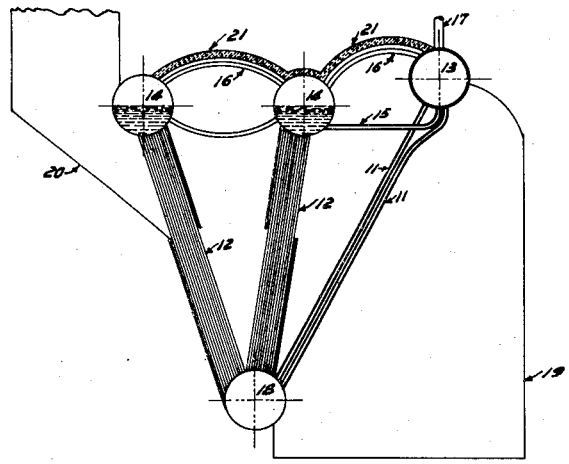
Figure 5 is a section of a Sterling or Heine bent tube V-type boiler.

Figure 5 shows my invention adapted to another type of boiler, the corresponding numbers indicating corresponding parts in previous description.

Figure 6:
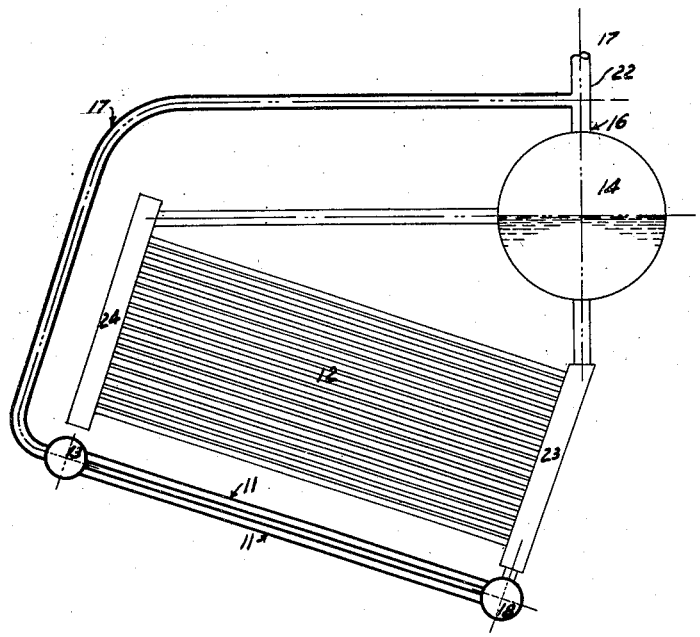
Figure 6 is a section of a boiler with tubes set at less than 30° to the horizontal through the furnace, such as the Babcock and Wilcox stationary or marine type boiler.

Figure 6 shows my invention adapted to a Babcock and Wilcox stationary or marine type of boiler. The tubes not exposed to radiant heat have separate headers 23 and 24. The main steam line 17 is connected to the liberating drum 13 by connection 22 that also connects the main steam line to the liberating drum in normal construction 14.

The diameter, length and thickness of the tubes exposed to radiant heat may be made of such dimensions as to allow sufficient circulation to deliver substantially dry or superheated steam into the separate drum 14. If a higher degree of superheat is desired than was originally designed, nipples may be secured into the outlet of the tubes discharging into drum 13, thereby cutting down the flow and increasing the superheat.

It will be understood that the above description and accompanying drawings comprehend only the general and preferred embodiment of my invention and that various minor details in construction and arrangement of parts may be made within the scope of the appended claim and without sacrificing any of the advantages of my invention.

Having described my invention what I claim is:

In a water tube boiler, a mud drum, a set of tubes exposed to heat of radiation and extending from said drum, a vapor collector for said tubes, a second set of tubes exposed to heat of convection and also extending from the drum, a vapor collector for said second set of tubes, the first collector being above the water level of the second collector, and a common vapor take-off for the collectors.

HARRY G. DONALD.